United States Patent [19]

Miyake et al.

[11] Patent Number: 4,486,105
[45] Date of Patent: Dec. 4, 1984

[54] SUPERSONIC EXTERNALLY PRESSURIZED GAS BEARING

[75] Inventors: Yutaka Miyake, Minoo; Susumu Murata, Nagoya; Takehiko Inaba, Ikoma, all of Japan

[73] Assignee: President of Osaka University, Osaka, Japan

[21] Appl. No.: 463,137

[22] Filed: Feb. 2, 1983

[30] Foreign Application Priority Data

Feb. 5, 1982 [JP] Japan .................................. 57-17887

[51] Int. Cl.$^3$ ........................ F16C 17/02; F16C 17/04
[52] U.S. Cl. ..................................... 384/114; 384/121
[58] Field of Search .................. 308/5 R; 384/99, 100, 384/107, 109, 114, 121, 303, 307, 322, 368, 369, 397, 398, 399; 138/40, 42, 43, 44, 46; 406/181

[56] References Cited

U.S. PATENT DOCUMENTS 3,801,165 4/1974 Lombard ............................ 308/5 R
4,232,913 11/1980 Nilsson ................................ 308/5 R

OTHER PUBLICATIONS

Externally pressurized bearings, Stout and Rowe, Tribology International, 1974.
Paper titled "A Theoretical Investigation of Pressure Depression in Externally Pressurized Gas-Lubricated Circular Thrust Bearings" by Haruo Mori presented at lecture held on Apr. 3, 1960, published Sept., 1960, pp. 1249–1258.
Paper title "Observation of Compressible Flow Between Circular and Parallel Plates", by Haruo Mori et al., published 1965, pp. 435–441.
Article titled "Theoretical and Experimental Pressure Distribution in Supersonic Domain for an Inherently Compensated Circular Thrust Bearing", by M. Poupard et al., Journal of Lubrication Technology, Apr. 1973, pp. 217–221.

Primary Examiner—Stuart S. Levy
Assistant Examiner—David Werner
Attorney, Agent, or Firm—Robert E. Burns; Emmanuel J. Lobato; Bruce L. Adams

[57] ABSTRACT

In an externally pressurized gas bearing used as a thrust or a journal bearing, the shape of a gap formed therein is selected so that the gas flowing velocity reaches the sound velocity in a predetermined position within the gap and a supersonic gas flow is maintained at the outer edge of the bearing, whereby an increase in supply gas pressure gives rise to a corresponding increase in load capacity and rigidity.

11 Claims, 3 Drawing Figures

SUPPLY GAS PRESSURE / ATMOSPHERIC PRESSURE

SUPERSONIC EXTERNALLY PRESSURIZED GAS BEARING

BACKGROUND OF THE INVENTION

1. Field of the Invention

The present invention relates to an externally pressurized gas bearing used as a thrust or journal bearing or the like.

2. Description of the Prior Art

In general, externally pressurized gas bearings have already been widely used practically, but all of these conventional ones premise that the gas flow within a bearing gap is a slow subsonic flow. The intra-bearing gap flow partially becomes a supersonic flow near the entrance of a gas supply hole, but a shock wave produced within the bearing gap causes the flow to become a subsonic flow at the outer edge of the gap. Consequently, as the supply gas pressure is increased, the load capacity and static rigidity take maximum values at a certain level of the supply gas pressure, and a further increase of the supply gas pressure results in a decrease of those values.

Then, after the supply gas pressure continues to increase until the shock wave reaches the outer edge of the bearing gap, a further increase thereof causes the load capacity and rigidity to increase again. In these conventional bearings, however, in order to realize a supersonic flow at the outer edge of the bearing gap, a several hundred atmospheric pressure is required as the supply gas pressure, and yet the load capacity and rigidity are limited. Static pressure gas bearings require only a small rotational torque and are therefore suitable for highspeed rotation, but are fundamentally disadvantageous in that the load capacity and rigidity cannot have large values for the above reason.

SUMMARY OF THE INVENTION

In order to eliminate the aforementioned basic drawback associated with the prior art bearings, the present invention aims at providing a supersonic externally pressurized gas bearing wherein a bearing gas has a specific shape to realize a supersonic flow easily at the outer edge of the bearing gap and wherein a gas flowing path formed in an inlet portion of a gas supply hole has a sufficiently large radius of curvature to prevent separation of the gas flow.

To achieve the above-mentioned object, the supersonic externally pressurized gas bearing of the present invention comprises a bearing portion for supporting a shaft, a gas supply hole formed in the bearing portion, a gas supply pipe connected to the gas supply hole, a first curved surface extending from the inner surface of the gas supply hole continuously to the inner surface of the bearing portion, and a second curved surface formed on the outer surface of the shaft in opposed relation to the first curved surface, wherein a gas flowing path between the first and second curved surfaces is formed so that it gradually becomes narrower as it goes away from the gas supply pipe.

According to the supersonic externally pressurized gas bearing of the present invention, there are obtained the following effects and advantages. As shown in the drawings, since curved surfaces 6 and 7 of a gas flowing path 8 have a sufficiently large radius of curvature, a gas passing through the interior of the path can reach a supersonic speed smoothly without causing separation of its flow, whereby the pressure of the gas filled in a gap between a shaft 1 and a bearing portion 2 permits the shaft 1 to be supported in a floating state without contacting the inner surface of the bearing portion 2. As previously noted, moreover, once the gas reaches a supersonic speed, the load capacity and static rigidity increase in proportion to an increase of the suppy gas pressure.

DESCRIPTION OF THE PREFERRED EMBODIMENTS

Embodiments of the present invention will be described hereinunder with reference to the accompanying drawings.

Figure 1:
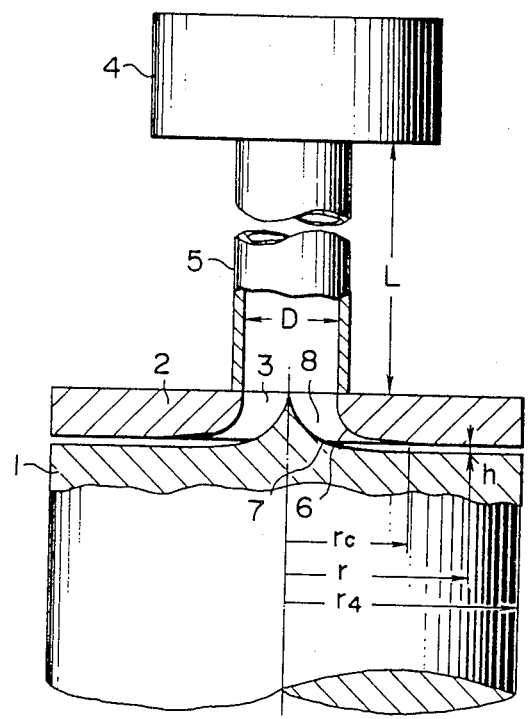
FIG. 1 schematically illustrates a thrust bearing according to a first embodiment of the present invention.

Referring first to FIG. 1, there is shown a supersonic externally pressurized gas thrust bearing according to a first embodiment of the present invention, wherein a gas supply hole 3 is formed in a bearing member or portion 2 which supports a body in the form of a shaft 1, and a gas supply pipe 5 extending from a high-pressure gas tank 4 is connected to the gas supply hole 3.

A first curved surface 6 is formed which extends with a geometrical continuity from the inner surface of the gas supply hole 3 to the inner surface of the bearing member or portion 2, while in opposed relation to the first curved surface 6 there is formed a second curved surface 7 on the outer surface of the shaft 1. Between the first and second curved surfaces 6 and 7 is formed a collar-like flowing path 8 so that the gas flowing path 8 gradually becomes narrower as it goes away from the gas supply pipe 5. Consequently, gas which has entered the gas supply hole 3 through the gas supply pipe 5 from the high-pressure gas tank 4 is contracted while flowing along the gas flowing path 8 and reaches a supersonic speed. In this case, since the curved surfaces 6 and 7 of the gas flowing path 8 have a sufficiently large radius of curvature, the gas passing through the interior of the path 8 can reach a supersonic speed smoothly without causing separation of its flow.

In this way, by virtue of the pressure of the gas filled in the gap between the shaft 1 and the bearing portion 2, the shaft 1 is supported in a floating state without contacting the inner surface of the bearing portion 2. And, as previously noted, once the gas reaches the supersonic speed, the load capacity and static rigidity increase in proportion to an increase of the supply gas pressure.

In FIG. 1, the bearing gap is formed so that the gas flow in the gas flowing path 8 reaches a supersonic speed smoothly. To this end, the flowing path width h is selected, for example, as follows with respect to radius r:

$$h = r_4 \left[ \frac{a}{(r/r_4)^m} + b \right]$$

where a, b and m (m>1) are constants and $r_4$ is the radius of the collar outer edge, and at $r=r_c$ ($r_3<r_c<r_4$), $$\frac{1}{r} \frac{d(hr)}{dr} = kf$$

where f: friction coefficient of the wall surface $=\tau\omega/\frac{1}{2}\rho v^2$, $\tau\omega$: frictional stress of the wall surface N/m², $\rho$: gas density kg/m³, v: gas velocity, $\kappa$: ratio of specific heat.

Figure 2:
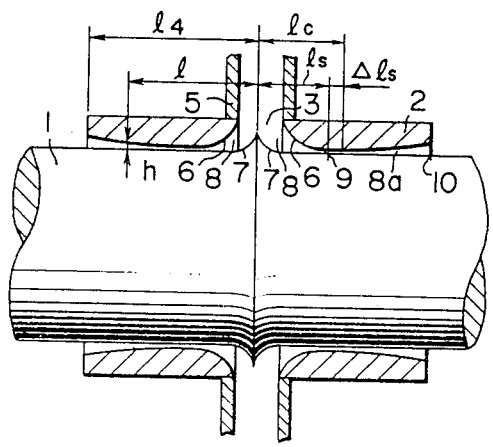
FIG. 2 schematically illustrates a journal bearing according to a second embodiment of the present invention.

Referring now to FIG. 2, there is shown a supersonic externally pressurized gas journal bearing according to a second embodiment of the present invention, wherein a gas supply pipe 5 extending from a high-pressure gas source (not shown) is connected to a gas supply hole 3 which comprises a slit formed along the circumference of a bearing portion 2 which supports a shaft 1.

And it is also acceptable that the gas supply hole 3 comprises plural circular apertures formed along the circumference of a bearing portion 2 which supports the shaft 1.

A pair of first right and left curved surfaces 6 are formed which extend with a geometrical continuity from the inner surface of the gas supply hole 3 to the inner surface of the bearing portion 2, while in opposed relation thereto a pair of second curved surfaces 7 are formed on the peripheral surface of the shaft 1. Between the first and second curved surfaces 6 and 7 are formed a pair of gas flowing paths 8 so that each of the paths 8 gradually becomes narrower as it goes away from the gas supply pipe 5 in the axial direction of the shaft 1.

In this second embodiment, moreover, the gas flowing path 8 contracts up to a position of a predetermined sectional area 9 between the shaft 1 and the inner surface of the bearing portion 2 and thereafter forms a flowing path 8a which gently expands up to a position indicated at 10.

The flowing path width h is selected, for example, as follows:

$$h = l_4 \left[ a \left| \frac{l - l_s}{l_4} \right|^m + b \right]$$

where a, b and m (m>1) are constants and $l_4$ is a distance between the center line of the gas supply hole and the outer edge of the bearing, and at $l=l_c=l_s+\Delta l_s$ wherein $\Delta l_s$ is a smaller constant than $l_s$, $dh/dl=\kappa f$.

Also in this second embodiment, about the same effect as in the foregoing first embodiment is obtainable, and since the gas flowing path 8 has a flowing path portion 8a which gently expands at the downstream side of the sonic point, a supersonic flow of a relatively low Mach number can be maintained.

Figure 3:
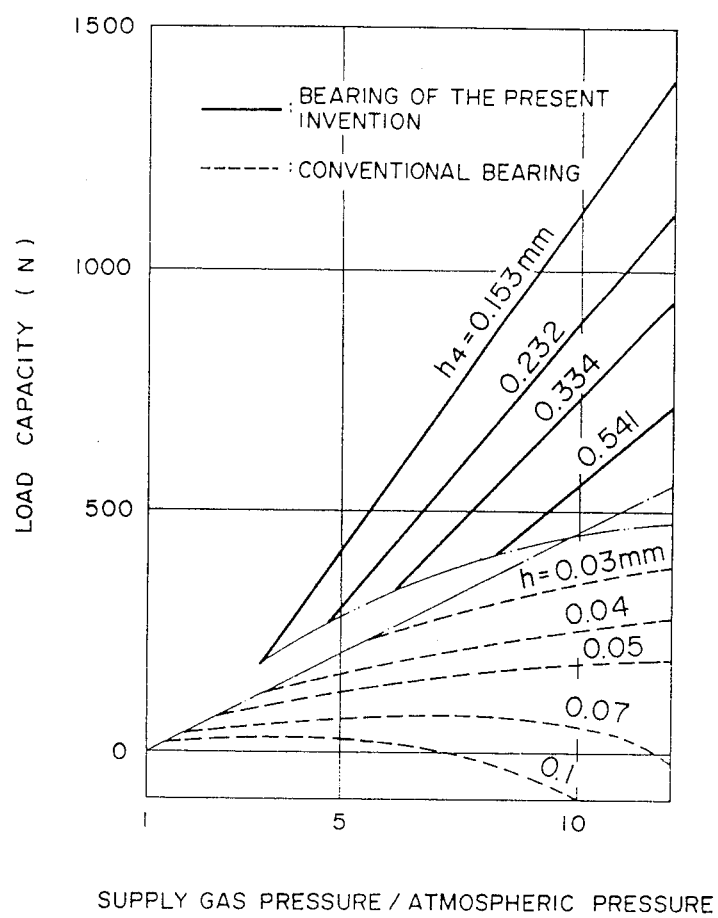
FIG. 3 graphically illustrates characteristics of a supersonic static pressure gas bearing embodying the invention, in comparison with a conventional like bearing.

Referring now to FIG. 3, there graphically is illustrated a comparison between the bearing of the present invention and a conventional bearing, wherein with respect to the load capacity of a thrust bearing having an outside radius $r_4=30$ mm, a gas supply pipe radius $r_2=6$ mm, a ratio of an effective gas supply pipe length L to the gas supply pipe diameter (D=2$r_2$) L/D=20, bearing shape constants a=4.105×10⁻⁵, m=5.0 and a friction coefficient f=0.0035, the solid line graph represents the bearing of the present invention and the broken line graph represents the conventional bearing with $r_2$ being equal to 2 mm.

In the conventional bearing, as shown in FIG. 3, the gap h is constant, and for any h value, as typically shown in the curve of h=0.1 mm, a maximum value is reached in the load capacity along with an increase of the supply gas pressure. On the other hand, in the supersonic externally pressurized gas bearing of the present invention, the load capacity, which serves as a force for floating the shaft within the bearing portion, increases infinitely with an increase of the supply gas pressure, and the static rigidity also increases in the same way as the supply gas pressure increases.

What is claimed is:

1. A supersonic externally pressurized gas bearing comprising a bearing portion for supporting a shaft, a gas supply hole formed in said bearing portion, a gas supply pipe connected to said gas supply hole, a first curved surface extending from an inner surface of said gas supply hole continuously to an inner surface of said bearing portion, and a second curved surface formed on the outer surface of said shaft in opposed relation to said first curved surface, wherein a gas flowing path between said first and second curved surfaces is formed so that it gradually becomes narrower as it goes away from said gas supply pipe.

2. A supersonic externally pressurized gas bearing according to claim 1, wherein said gas flowing path contracts up to a position of a predetermined sectional area between said shaft and the inner surface of said bearing portion and thereafter forms a gently expanding flowing path.

3. A supersonic externally pressurized gas bearing according to claim 1, wherein said bearing is formed as a thrust bearing and the bearing gap formed between said first and second curved surfaces, namely, a flowing path width h, is formed as follows with respect to a radius r from the center line of said gas supply hole:

$$h = r_4 \left[ \frac{a}{(r/r_4)^m} + b \right]$$

where a, b and m (m>1) are constants and $r_4$ is a radius from the center line of said gas supply hole up to the shaft outer edge.

4. A supersonic externally pressurized gas bearing according to any of claim 1, wherein said bearing is formed as a journal bearing and the flowing path width h as the bearing gap formed between said first and second curved surfaces is formed as follows with respect to a distance l from the center line of said gas supply hole:

$$h = l_4 \left[ a \left| \frac{l - l_s}{l_4} \right|^m + b \right]$$

where a, b and m (m>1) are constants, $l_4$ is a distance from the center line of said gas supply hole up to the bearing portion outer edge and $l_s$ is a distance from the center line of said gas supply hole up to a position of a reduced sectional area.

5. In combination: a movable body; and a supersonic externally pressurized gas bearing for movably supporting the body in a floating state, the bearing comprising a bearing member spaced from the body and having an inner surface facing the body and an outer surface and having means defining an opening extending completely therethrough between the inner and outer surfaces, the opening being defined by a first curved surface extending from the outer surface continuously to the inner surface, and means for supplying pressurized gas to the opening during use; the body having on its outer surface a second curved surface in spaced-apart and opposed relation to the first curved surface and defining therewith a gas flow path of gradually narrowing size in the direction away from the center of the opening, the gas flow path being configured to effect flow of the pressurized gas therethrough at supersonic speed without causing separation of the gas flow; whereby the body can be supported in a floating state without contacting the inner surface of the bearing member.

6. The combination according to claim 5; wherein the body has a projection projecting outwardly thereof into the bearing member opening, the projection having an outwardly tapering shape which defines the second curved surface.

7. The combination according to claim 6; wherein the bearing comprises a thrust bearing.

8. The combination according to claim 6; wherein the bearing comprises a journal bearing.

9. The combination according to claim 5; wherein the gap spacing between the bearing member inner surface and the body outer surface is substantially constant in the region downstream of the first curved surface.

10. The combination according to claim 5; wherein the gap spacing between the bearing member inner surface and the body outer surface is substantially constant for a predetermined distance downstream of the first curved surface and thereafter the gap spacing gradually increases.

11. The combination according to claim 5; wherein the gas flow path is configured such that the load capacity of the bearing is proportional to the pressure of the pressurized gas.

* * * * *